(12) United States Patent
Wollrab

(10) Patent No.: US 6,920,328 B2
(45) Date of Patent: Jul. 19, 2005

(54) FAMILY CALENDAR NOTIFICATION AND TRACKING

(75) Inventor: Lee M. Wollrab, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 691 days.

(21) Appl. No.: 09/942,901

(22) Filed: Aug. 30, 2001

(65) Prior Publication Data

US 2003/0045301 A1 Mar. 6, 2003

(51) Int. Cl.$^7$ .............................................. H04M 3/42
(52) U.S. Cl. ................ 455/456.1; 455/13.2; 455/414.1; 455/566
(58) Field of Search ................................ 455/456, 414, 455/266, 404; 342/357.11; 701/207, 208, 209; 340/990, 995

(56) References Cited

U.S. PATENT DOCUMENTS

| | | | | |
|---|---|---|---|---|
| 5,854,793 | A | * 12/1998 | Dinkins | 370/503 |
| 6,414,629 | B1 | * 7/2002 | Curcio | 342/357.08 |
| 6,463,272 | B1 | * 10/2002 | Wallace et al. | 455/404.2 |
| 6,542,812 | B1 | * 4/2003 | Obradovich et al. | 701/207 |
| 6,618,593 | B1 | * 9/2003 | Drutman et al. | 455/456.3 |
| 6,661,409 | B2 | * 12/2003 | Demartines et al. | 345/173 |
| 2002/0006800 | A1 | * 1/2002 | Mohi | |
| 2002/0116336 | A1 | * 8/2002 | Diacakis | |
| 2003/0035544 | A1 | * 2/2003 | Herle et al. | |

OTHER PUBLICATIONS

Jones, Jennifer, "Cell Phone Basics How to Choose the Right Cell Phone for You," http://equip.zdnet.com/communications/cellularphones/feature/16f0a/index_6_1.html, Jul. 12, 2000, p. 6–10.

"Magellan GPS Companion," http://www.handspring.com/products/sbmodules/magellandetails.jhtml, Aug. 2, 2001, p. 1–2.

"Springport Modem 56 GlobalACCESS," http://www.handspring.com/products/sbmodules/springportdetails.jhtml, Aug. 2, 2001, p. 1–2.

"SpringPort Modem 56 Global ACCESS," http://www.palmgear.com/hs/products/prodoverview.cfm?=prodID=354&prodcatID=5, Aug. 2, 2001, p. 1–2.

"Magellan CPS Companion for Handspring Visor," http://www.palmgear.com/hs/products/prodoverview.cfm?=prodID=388&prodcatID=5, 2, Aug. 2, 2001, p. 1–2.

* cited by examiner

Primary Examiner—Fan Tsang
Assistant Examiner—Ming Chow

(57) ABSTRACT

The present invention is directed to an electronic system and method for managing location, calendar, and event information. The system comprises at least two hand portable electronic devices, each having a display device to display personal profile, location, and event information, and means for processing, storing, and wirelessly communicating data. A software program running in the electronic device can receive local and remote input data; store, process, and update personal profile, event, time, and location information; and convert location information into coordinates of a graphic map display. The system additionally includes at least one earth orbiting satellite device using remote sensing technology to determine the location coordinates of the electronic device. The electronic devices receive synchronization messages broadcast by the satellite device, causing the software program to update the personal profile, event, time, and location information stored in each hand portable electronic device.

41 Claims, 2 Drawing Sheets

FAMILY CALENDAR NOTIFICATION AND TRACKING

TECHNICAL FIELD

This application relates to wireless communication and tracking, and more particularly to family calendar notification and tracking.

BACKGROUND

In the present environment there are many different devices for communicating between people or between groups of people. However, even if everybody carried a wireless telephone or similar device, there is no efficient method for families or other groups to plan meetings/events and to communicate changes in individual plans that could affect the family meeting/event. For example, a child could be injured, and a parent making an unplanned detour to a hospital emergency room might not have time to tell/call everyone else to let them know of the change in plans.

Likewise, there is presently no efficient way of determining the location of a member of a family or other group. In one scenario, if a teenager borrows the family car on a Friday night, has a car wreck, and rolls off a cliff, nobody would know the location of the teenager. Assuming that the teenager was expected home at 2:00 a.m. and the parents were alarmed at 3:00 a.m., the parents would have no idea of the teenager's present location or any record of the last location of the teenager.

SUMMARY OF THE INVENTION

The present invention is directed to an electronic system and method for managing location, calendar, and event information. The system comprises at least two hand portable electronic devices, each having a display device to display personal profile, location, and event information, and means for processing, storing, and wirelessly communicating data. A software program running in the electronic device can receive local and remote input data; store, process, and update personal profile, event, time, and location information; and convert location information into coordinates of a graphic map display. The system additionally includes at least one earth orbiting satellite device using remote sensing technology to determine the location coordinates of the electronic device. The electronic devices receive synchronization messages broadcast by the satellite device, causing the software program to update the personal profile, event, time, and location information stored in each hand portable electronic device.

DETAILED DESCRIPTION

Figure 1:
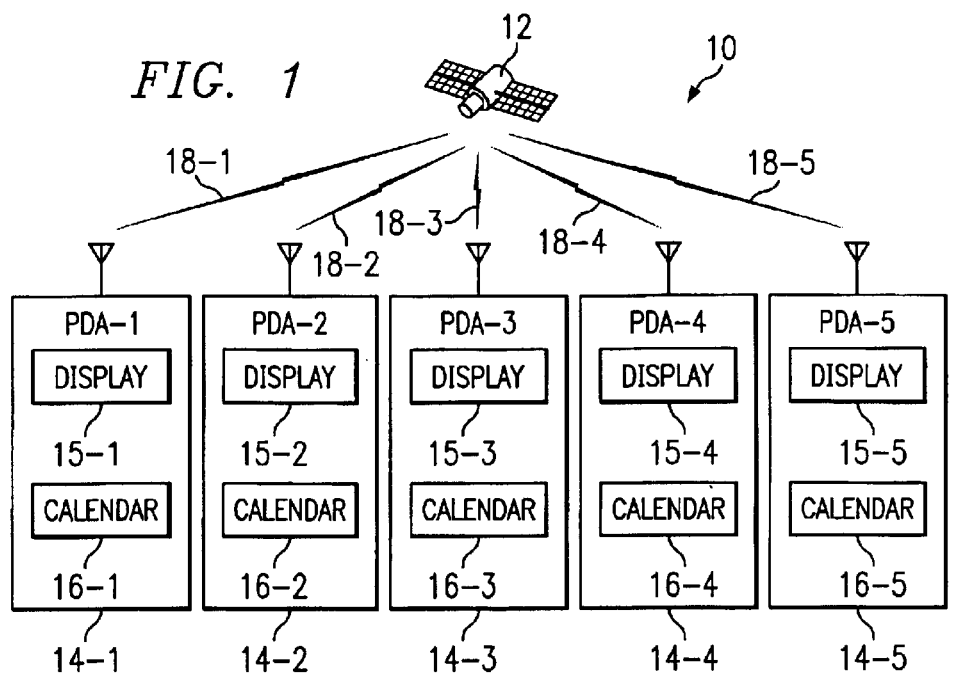
FIG. 1 is a high level schematic diagram illustrating the hardware architecture of a Family Calendar Tracking and Notification system, in accordance with embodiments of the present invention.

FIG. 1 is a high level schematic diagram illustrating the hardware architecture of a Family Calendar Tracking and Notification system, in accordance with embodiments of the present invention. Family Calendar Tracking and Notification system 10 includes one to many substantially identical personal digital assistant (PDA) devices represented by PDA devices PDA-1 through PDA-5 (PDA devices 14-1 through 14-5) and one or more satellite devices 12. PDA device 14-1 through 14-5 is an hand portable electronic device similar, for example, to commercially available Hewlett Packard Jornada™, Palm Pilot™, Handspring Visor™, Compaq iPaq™, Sony CLIE™, cellular and/or 'smart' wireless telephones, which is 2-way wireless communications capable and is remote sensing capable. Each PDA device 14-1 through 14-5 includes a respective display device 15-1 through 15-5.

Installed in each PDA device 14-1 through 14-5 is a copy of calendar 16-1 through 16-5, a software program which can store family member profiles, member calendars, member locations, and family profiles. Calendar 16-1 through 16-5 is capable of tracking and synchronizing events (appointments such as face-to-face or telephone meetings, sporting events, social events, etc), established by a member, e.g., user identified by a person's first name and last name, who is defined within a member profile which contains the member's personal information. Events preferably require uniquely associating a time and date with a physical location, which can be shared among a pre-defined family of members in order to facilitate members being able to meet, physically and/or virtually, at the same time, on the same date. The term "family" as defined herein is generalized to include not only biologically related individuals, but social, recreational, educational, professional, work, or other common interest groups of individual members that have a need or interest in maintaining close communication among themselves. Although typically a separate PDA device 14-1 through 14-5 is assigned to each individual family member, in some implementations a single PDA device can be shared among two or more family members.

PDA devices 14-1 through 14-5 communicate with one another via satellite device 12 and also by direct 2-way wireless communication. Satellite device 12 is a global communications device orbiting the earth substantially above the earth's atmosphere and capable of continuously (24 hours per day and 7 days per week) receiving information from and broadcasting information to (transceiving) one or more PDA devices 14-1 through 14-5 and its respective installed calendar 16-1 through 16-5. Satellite device 12 and PDA devices 14-1 through 14-5 collectively utilize remote sensing technology and interactive wireless communication to track the physical location of each PDA device 14-1 through 14-5.

In operation, calendar 16-1 through 16-5 stores information including member profiles, member calendars, member locations, and family profiles. Member profile(s) include information pertaining to individual members, for example:

- email address—e.g., firstname_lastname@subdomain.domain;
- member name—e.g., firstname lastname;
- residence address—e.g., street, city, state/province, zip/postal code, country;
- residence and/or other phone—e.g., dialing code and number;
- FAX phone;
- text-based notes—e.g., up to a defined number of characters;
- other member-defined fields—e.g., date of birth, date of marriage, alternate address/phone/fax/email address; and/or family membership—e.g. family name and/or alphanumeric identifying code/password.

Member copies of calendar 16-1 through 16-5 track and synchronize events identified by descriptive names, which provide the parent fields for attendees, event location, time and date. An event location includes physical address, e.g., street address, city, state/province, zip/postal code, country, and REMOTE SENSING location coordinates, e.g., latitude-longitude coordinates (degrees, minutes, seconds), which are the basis of a vector-based Geographic Information System [GIS] data set, where data are stored as a sequence of precise X,Y coordinates and vectors which can be displayed as a map image on PDA device 14-1 through 14-5, as described below in more detail. Other event location data include phone number at the event location and/or phone number of a designated event contact individual, and Internet URL for an electronic meeting room.

Member location(s) are preferably stored in calendar 16-1 through 16-5 as remote sensing location coordinates defined above, and are updated periodically for each member. In some embodiments, multiple sequential sets of remote sensing location coordinates are stored for each member to create a historical tracking record of movement for the member/PDA device. This can be retrieved later to determine where a member/PDA device has been physically located over time for such purposes as tracking member movements or locating a lost member. Calendar 16-1 through 16-5 can translate remote sensing location coordinates into a graphic map image, e.g. a .jpg or .gif file, depicting the relative locations of all members/PDA devices within a family. In a family profile, calendar 16-1 through 16-5 stores an alpha-numeric family name/identifier and a list of all members, for example, in order of their email address.

Calendar 16-1 through 16-5 preferably generates information requests, including membership requests from within the family requesting a membership status for a non-member and from non-members requesting to join a specified family. Calendar 16-1 through 16-5 additionally generates synchronization requests from members, requesting synchronization within a family, for example to update member profile information, update member calendar information, update member location information, and/or update family profile information; and from within calendar 16-1 through 16-5 requesting synchronization among a family and or with a member to update the above information among the family or a subset of the family.

Figure 2:
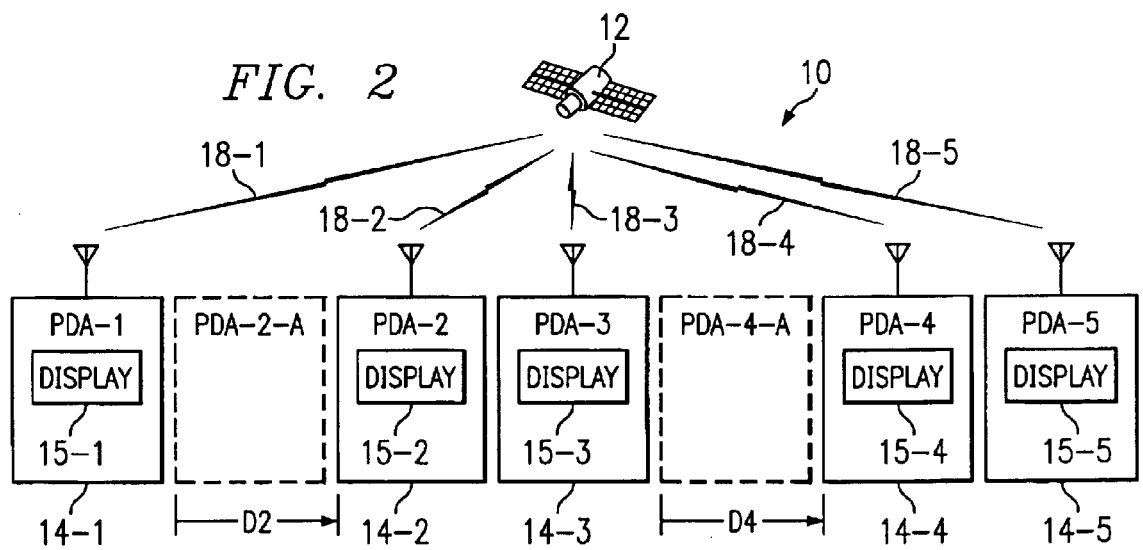
FIG. 2 is a schematic diagram illustrating the transmission of physical location information of PDA devices after a change of physical locations relative to those of FIG. 1.

Calendar 16-1 through 16-5 preferably sends to and/or routes to and receives from satellite device 12 in encrypted format any of the information in the member profile, member calendar, member location, and or family profile destined for member(s) email address. Calendar 16-1 through 16-5 processes queries, sorts requests, and synchronizes calendars among members within a family/group. FIGS. 1 and 2 illustrate communication between calendars 16-1 through 16-5 in PDA devices 14-1 through 14-5 via satellite device 12 over wireless data paths 18-1 through 18-5 respectively, for example to synchronize calendars 16-1 through 16-5. Calendar synchronization occurs at regular intervals, e.g. at 5-minute intervals. Calendar 16 generates a new family code or password periodically, for example each time family membership changes, and distributes it to each family member's profile. Calendar 16-1 through 16-5 displays via display devices 15-1 through 15-5 information including the respective member's profile, location, and events, in addition to other family members' profiles, locations, and events.

Satellite device 12 preferably receives, processes and stores information sent from individual PDA devices 14-1 through 14-5 into vector-based remote sensing data representing the physical location of the PDA device, and broadcasts information simultaneously to multiple PDA devices 14-1 through 14-5. The updated physical location information is transmitted in accordance with an established schedule (e.g. every 5 minutes) to specific member PDA devices or to all PDAs within a defined family for synchronizing/replication. This transmission can be sent either directly via infrared or other wireless link from one PDA to another PDA in sufficient proximity or to satellite device 12 for rebroadcast to all PDA devices within a defined family. FIG. 2 is a schematic diagram illustrating the transmission of physical location information of PDA devices after a change of physical locations relative to those of FIG. 1. In FIG. 2, PDA device 14-2 has moved through a displacement D2 relative to its previous position PDA-2-A and PDA device 14-4 has likewise moved through a displacement D4 relative to its previous position PDA-4-A. As illustrated in FIG. 2, remote sensing coordinates reflecting the movements of PDA devices 14-2 and 14-4 are broadcast by satellite device 12 to all PDA devices 14-1 through 14-5 of system 10.

Figure 3:
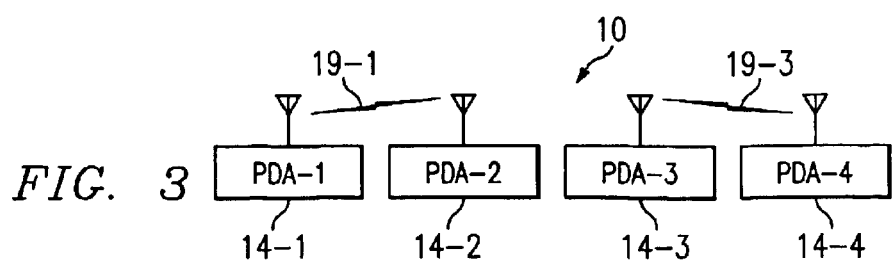
FIG. 3 is a schematic diagram illustrating two-way direct wireless communication between PDA devices.

PDA device 14-1 through 14-5 stores and runs calendar software program 16-1 through 16-5 used to manage all information storage and transfers between PDA devices 14-1 through 14-5 via satellite device 12. PDA devices 14-1 through 14-5 communicate directly with one another over wireless data paths 19-1, 19-3 as illustrated in FIG. 3, to exchange stored information/data using, for example, infrared technology. Alternatively, PDA devices 14-1 through 14-5 communicate with one another using one or more of other short distance wireless technologies, for example, cellular technology or Bluetooth™ technology which, unlike infrared, are not restricted to line of sight transmission. In some embodiments, wireless portions of data paths between PDA devices 14-1 through 14-5 are interconnected through terrestrial wired network portions, for example telephone cable and/or the public Internet.

Figure 4A:
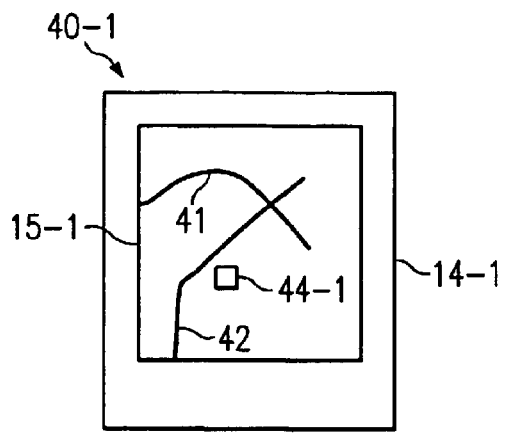
FIGS. 4A–4C are schematic representations depicting exemplary map images on the display screen of a PDA device.
Figure 4B:
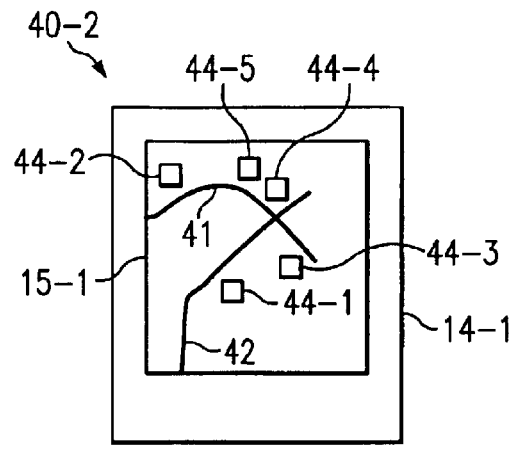
Figure 4C:
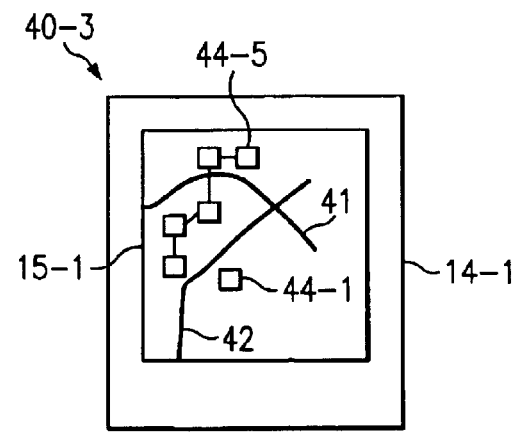

PDA devices 14-1 through 14-5 can utilize wireless remote sensing technology to establish and communicate remote sensing data between PDA device 14-1 through 14-5 and satellite device 12. PDA device 14-1 through 14-5 can display a map image via display device 15-5 through 15-5 depicting the relative locations of all members/PDA devices within a family. FIGS. 4A–4C are schematic representations depicting exemplary map images 40-1 through 40-3 on the screen of display device 15-1 of PDA device 14-1. In map image 40-1 the location 44-1 of family member/PDA device 14-1 is shown relative to physical features, for example roads 41 and 42. In map image 40-2 the locations 44-1 through 44-5 of five family members/PDA devices 14-1 through 14-5 respectively are shown simultaneously relative to one another and relative to roads 41, 42. In map image 40-3 symbols interconnected with location 44-5 depict sequential historical locations of family member/PDA device 14-5 relative to location 44-1 of PDA device 14-1 and roads 41, 42.

Calendar 16-1 through 16-5 utilizes existing technologies, for example Lotus Notes/Domino and/or Microsoft Outlook/Exchange can provide a base software program to achieve the calendar functions described above. Calendar 16-1 through 16-5 additionally includes software to receive, process, and store physical location information (vector-based remote sensing coordinates), which can be updated periodically to track physical movements as a member/PDA device moves from one location to another. Typically, calendar 16-1 through 16-5 runs on a microcomputer installed in PDA device 14-1 through 14-5 and stores information in a digital memory device, for example RAM, flash EPROM, other non-volatile memory, or some combination thereof installed in PDA device 14-1 through 14-5.

Some embodiments include alternative PDA devices providing a reduced subset of the functionality of PDA devices described above. These reduced functionality PDA devices function primarily as location reporting devices, applicable for example to young children, physically and/or mentally handicapped, aged, or retarded individuals. The reduced functionality PDA devices can be further applicable to convicts, parolees, and/or other offenders, and can be configured, for example, as collars, necklaces, bracelets, belts, and/or anklets.

Synchronizing has been commercialized, for example, using Lotus Notes/Domino software, and is commonly referred to as "replication". This technology can be adapted in embodiments of the present invention to encompass and manage synchronization in an environment where the wireless communication link between two PDA devices is via satellite device 12.

Embodiments of the present invention provide a system and method in which a master family calendar is synchronized with PDAs for each family member, which tracks each PDA location via remote sensing (satellite) and alerts other family members (e.g. parents) to the locations of other family members' (e.g. children) PDAs or alternatively their cellular or 'smart' wireless telephones. In some embodiments, the system also e-mails or sends a periodic electronic notification to each family member of family events (e.g. kids swim lesson Monday night at West Boise YMCA at 6:30 p.m.), which can include driving directions customized for the specific location of each family member to get from their current location to the event. Embodiments of the system communicate changes in individual plans which could affect the family meeting/event. (e.g., child gets hurt and parent takes detour to hospital and does not have time to tell/call everyone else to let them know of change in plan, in which case a PDA device could take one message and location and communicate it to rest of family with details of why a change had to occur, seriousness of situation, etc.) Optionally, an alert is issued when changes in plans are communicated.

In some embodiments, a PDA device transmits an alarm message if the device location moves outside of a prescribed physical limit. For example, if a child had a boundary prescribed on their PDA device, and the device is carried past the boundary, then an alert is issued to all the other PDA devices/family members.

Embodiments in accordance with the present invention allow members of a family or other group to share calendar schedule information on a hand portable device in near real time and to synchronize that information through wireless communications with other members of an identified family, work, or other group. Not only is information synchronized, but the location of that device is also tracked and shared among the group. Location information can then be converted and displayed, for example as coordinates on a graphic map. Through remote sensing, the present system allows family members to know/see the locations of other family members without having to physically search.

In a further embodiment, a PDA device transmits an alarm, if the device moves outside of a prescribed limit. For example, if limits are set on a child's PDA device and if the device is carried beyond those limits, then an alert can be transmitted to all the other family members to warn that this child is out of its bounds.

A member's PDA device stores not only the last record of that member's own location and calendar entries, but in addition the records of the last entries from each of the other PDA devices/family members. This decentralized architecture maintains peer to peer functionality, without adding another layer, for example a group store. Advantageously, peer to peer functionality also confers robustness through redundancy, such that if a PDA device becomes inoperative for a short time and consequently misses a message, a backup copy of the message can be recovered and retransmitted at a later time by another PDA device in the group.

In a further embodiment, a PDA device can also store all of a member's personal contact information, for example address book and telephone numbers, and can communicate in the background with individuals and groups outside the immediate group. These background communications can be, for example, with another family group or work group, to be aware of their calendars and they aware of the member's group, to help in coordination of event planning and other activities involving more than one group. Additionally, a PDA device can provide linkages between personal contact information and event/location information. For example a member viewing an event display can utilize a short cut access to the personal contact information for the responsible individual. Likewise a member viewing a display of location coordinates for a PDA device assigned to another member can utilize a short cut access to that other member's personal contact information.

Calendar 16-1 through 16-5 is able to translate Global Positioning System (GPS) or other remote sensing location coordinates into a visual map image depicting the relative locations of all members/PDA devices within a family. GPS tracking, reporting and display for a Handspring Visor™ can be accomplished by Magellan Corporation, 960 Overland Court, San Dimas, Calif. 91773, Tel (800) 669-4477, Fax (909)394-7050, which has commercialized a GPS module for any Handspring (Handspring, Inc., 189 Bernardo Avenue, Mountain View, Calif. 94043, Tel (716) 871-6448, support@handspring.com) Visor™ hand held PDA in the form of a Magellan GPS Companion™ (http://handspring.com/products/sbmodules/magellandetails.jhtml and http://www.palmgear.com/hs/products/prodoverview.cfm?prodID=388&prodcatID=5) springboard (plug-in) module, but this is a singular module which does not allow simultaneous wireless communication to the public Internet.

Xircom, Inc., 2300 Corporate Center Dr., Thousand Oaks, Calif. 91320, Tel (805) 376-9300, Fax (805) 376-9311, has commercialized wireless communication to the public Internet for the Handspring Visor™ handheld PDA in the form of a Springport™ Modem 56 GlobalACCESS™ (http://handspring.com/products/sbmodules/springportdetails.jhtml and http://www.palmgear.com/hs/products/prodoverview.cfm? prodID=354&prodcatID=5) springboard (plug-in) module. This is a singular module which does not allow simultaneous remote sensing capability.

'Smart phones' are cellular wireless telephones incorporating minibrowsers that provide Internet access as well as personal digital assistant (PDA) functionality. PDA functions typically include a calendar, address book, contact manager, task list, and occasionally an alarm, scheduler, and calculator. Additionally, a smart phone's ability to store personal information generally goes beyond that of the internal phone book in a standard, voice-only wireless phone. For further discussion, see for example http://equip.zdnet.com/communications/cellularphones/feature/16f0a/index_6_1.html.

Embodiments of the present invention provide two-way wireless communication between a PDA device and at least one satellite, which is simultaneously used to continually track the physical location of the PDA device (and/or multiple PDA devices) and communicate this location data (remote sensing coordinates) to all PDA devices within a defined family. Alternatively, more than one type of satellite can be used in embodiments of the present invention. For example, one type of satellite can perform physical location tracking functions using remote sensing, and a second type of satellite can provide two-way wireless communication with one or more PDA devices, including broadcast wireless transmission. Particularly, embodiments of the present invention fill a parent's need to track their teenager that borrowed the family car on a Friday night and to know that teenager's whereabouts at a particular time.

What is claimed is:

1. An electronic system for managing location and event information for members of a defined group, said system comprising:
   a plurality of portable electronic devices possessed by the group members, each electronic device including:
   a display device operable to display information; and
   means for processing, storing, and wirelessly communicating data;
   a software program stored in each portable electronic device, each software program operable to:
   receive locally input data and wirelessly communicated remotely input data from other portable electronic devices;
   store, process, and update personal profile, event, time, and location information of all group members;
   convert location information into coordinates of a graphic map for display; and
   display coordinates of each member's portable electronic device in a map image to indicate the location of each group member; and
   at least one earth orbiting satellite device operable in cooperation with each portable electronic device using remote sensing technology to:
   determine location coordinates of said portable electronic devices; and
   broadcast synchronization messages received by each portable electronic device to each other portable electronic device, causing said software program stored in each electronic device to update said personal profile, event, time, and location information stored in said electronic devices so that each group member is provided with updated information as to the other group members and member events.

2. The system of claim 1 wherein at least one of said portable electronic devices comprises a wireless telephone selected from the group consisting of a cellular telephone and a smart telephone.

3. The system of claim 1 wherein said locally input data are input manually.

4. The system of claim 1 wherein said means for wirelessly communicating data are selected from the group consisting of e-mail, infrared technology, cellular technology, and short distance wireless technology.

5. The system of claim 1 wherein said synchronization messages are broadcast at regular intervals.

6. The system of claim 1 wherein said synchronization messages are broadcast upon request from said software programs.

7. The system of claim 1 wherein said location information comprises instructions for traveling to the location of an event from the location of at least one of said portable electronic devices.

8. The system of claim 1 wherein said software program is further operable to store, process, and display sequentially historical locations of at least one of said hand portable electronic devices in said map image.

9. The system of claim 1 wherein said software program is further operable to store, process, update, and display personal contact information.

10. The system of claim 1 wherein said wirelessly communicated remote input data are encrypted.

11. The system of claim 1 wherein wirelessly communicating comprises two-way direct wireless communication between any two individual portable electronic devices.

12. The system of claim 1 wherein said software program is further operable to issue and communicate alerts, alarms, and notifications to other portable electronic devices.

13. The system of claim 1 wherein said software program is further operable to communicate changes of plans to other electronic devices that potentially affect events.

14. The system of claim 1 wherein said means for processing comprise a microcomputer.

15. The system of claim 1 wherein said means for storing are selected from the group consisting of RAM memory, flash EPROM memory, and non-volatile digital memory.

16. A method of managing and communicating information among a plurality of substantially identical portable electronic devices possessed by members of a defined group, said method comprising performing the following on each portable electronic device:
   determining, processing, and storing location coordinates of each portable electronic device; inputting, processing, and storing user profile information relating to the group member that possesses the portable electronic device;
   inputting, processing, and storing collective profile information relating collectively to all group members;
   inputting, processing, and storing event calendar information, said event calendar information including participants, date, time, and location of an event;
   wirelessly communicating and synchronously updating said location coordinates, said profile information, and said event calendar information, such that each group member's portable electronic device stores identical updated information; and
   displaying said location, profile, and event calendar information in a display of each group member's portable electronic device so that each group member is provided with undated information as to the other group members and member events.

17. The method of claim 16 wherein said location coordinates and location information are displayed according to coordinates in a graphic map format.

18. The method of claim 16 wherein said location coordinates are determined using satellite remote sensing technology.

19. The method of claim 16 wherein said portable electronic devices comprise wireless telephones, each having an integral display device.

20. The method of claim 16 wherein said inputting is performed manually.

21. The method of claim 16 wherein said wirelessly communicating is performed utilizing a technique selected from the group consisting of e-mail, infrared technology, and short distance wireless technology.

22. The method of claim 16 wherein said synchronously updating is performed simultaneously at regular intervals for all of said portable electronic devices.

23. The method of claim 22 wherein said synchronously updating occurs in substantially real time.

24. The method of claim 16 wherein said location information comprises instructions for traveling to the location of said event from the location of at least one of said portable electronic devices.

25. The method of claim 17 wherein a graphic map representing sequentially historical locations of at least one of said portable electronic devices is displayed.

26. The method of claim 16 wherein a graphic map representing relative locations of each portable electronic devices is displayed.

27. The method of claim 16 further comprising storing, processing, updating, and displaying personal contact information.

28. The method of claim 16 further comprising encrypting prior to wirelessly communicating and synchronously updating said location coordinates, said profile information, and said event calendar information.

29. The method of claim 16 further comprising communicating changes of plans to each portable electronic device that potentially affect events.

30. The method of claim 16 further comprising issuing and communicating alerts, alarms, and notifications between said portable electronic devices.

31. The method of claim 30 wherein an alarm is issued if a particular portable electronic device within said plurality of portable electronic devices is transported to a location outside of a prescribed coordinate boundary for the particular portable electronic device.

32. The method of claim 16 wherein said storing, updating, and wirelessly communicating are performed utilizing identical copies of a software program running in each portable electronic device.

33. A portable electronic device of a particular member of a defined group, the device comprising:
   a display device operable to display information;
   means for processing, storing, and wirelessly communicating data;
   a software program stored in said electronic device, said software program operable to:
      receive locally input data and wirelessly communicated remotely input data from electronic devices of other members,
      store, process, and update personal profile, event, time, and location information of all members group members,
      convert location information into coordinates of a graphic map for display; and
      display coordinates of each member's electronic device in a map image to indicate the location of each group member;
   wherein said portable electronic device is operable to send to and receive from at least one earth orbiting satellite device synchronization messages and location coordinates obtained using remote sensing technology so that each group member is provided with updated information as to the other group members and member events.

34. The portable electronic device of claim 33 wherein the portable electronic device a wireless telephone selected from the group consisting of a cellular telephone and a smart telephone.

35. The portable electronic device of claim 33 wherein said locally input data are input manually.

36. The portable electronic device of claim 33 wherein said means for wirelessly communicating data are selected from the group consisting of e-mail, infrared technology, cellular technology, and short distance wireless technology.

37. The portable electronic device of claim 33 wherein said event information comprises instructions for traveling to the location of an event from the location of said portable electronic device.

38. The portable electronic device of claim 33 wherein said software program is further operable to store, process, and display at said display device a graphic map representing sequentially historical locations of said portable electronic device.

39. The device of portable electronic claim 33 wherein said software program is further operable to store, process, update, and display personal contact information.

40. The portable electronic device of claim 33 operable to wirelessly communicate with a plurality of substantially identical portable electronic devices used by other group members, each portable electronic device storing a copy of said software program, said software program further operable to receive, store, process, update, display, and wirelessly communicate individual and collective personal profile, event, time, and location information relating to all of the group members.

41. The portable electronic device of claim 33 wherein said means for storing are selected from the group consisting of RAM memory, flash EPROM memory, and non-volatile digital memory.

* * * * *